US012687045B2

(12) United States Patent
Yu

(10) Patent No.: US 12,687,045 B2
(45) Date of Patent: Jul. 21, 2026

(54) LOCK FOR LOCKING MULTIPLE OBJECTS

(71) Applicant: FULLYEAR-BROTHER ENTERPRISE CO., LTD., Changhua County (TW)

(72) Inventor: Chun Te Yu, Changhua County (TW)

(73) Assignee: FULLYEAR-BROTHER ENTERPRISE CO., LTD., Changhua County (TW)

( * ) Notice: Subject to any disclaimer, the term of this patent is extended or adjusted under 35 U.S.C. 154(b) by 14 days.

(21) Appl. No.: 18/753,151

(22) Filed: Jun. 25, 2024

(65) Prior Publication Data

US 2024/0426142 A1 Dec. 26, 2024

(30) Foreign Application Priority Data

Jun. 26, 2023 (TW) ................................. 112123665

(51) Int. Cl.

*E05B 67/00* (2006.01)
*E05B 37/00* (2006.01)
*E05B 73/00* (2006.01)
*E05B 37/02* (2006.01)

(52) U.S. Cl.

CPC ........ *E05B 67/003* (2013.01); *E05B 37/0034* (2013.01); *E05B 73/0005* (2013.01); *E05B 37/02* (2013.01)

(58) Field of Classification Search

CPC .. E05B 37/0031; E05B 37/0034; E05B 37/02; E05B 37/025; E05B 67/003; E05B 73/0005

See application file for complete search history.

(56) References Cited

U.S. PATENT DOCUMENTS

| | | | | |
|---|---|---|---|---|
| 6,109,074 A * | 8/2000 | Du | E05B 67/003 70/49 |
| 6,332,345 B1 * | 12/2001 | Huang | A44B 15/002 70/459 |
| 7,131,298 B1 * | 11/2006 | Haraughty | E05B 67/003 70/30 |
| 7,251,965 B2 * | 8/2007 | Yu | E05B 37/025 70/53 |
| 8,839,650 B2 * | 9/2014 | Zuraski | E05B 67/003 70/52 |
| 10,550,608 B2 * | 2/2020 | Lam | E05B 67/003 |
| 10,633,891 B2 * | 4/2020 | Sidhu | E05B 67/28 |
| 11,828,089 B2 * | 11/2023 | Yu | E05B 37/025 |
| 2005/0235705 A1 * | 10/2005 | Ling | E05B 37/025 70/284 |
| 2008/0066500 A1 * | 3/2008 | Su | E05B 37/025 70/21 |

* cited by examiner

*Primary Examiner* — Christopher J Boswell

(74) *Attorney, Agent, or Firm* — MUNCY, GEISSLER, OLDS & LOWE, P.C.

(57) ABSTRACT

A cable lock capable of locking multiple objects, comprises a housing, a plurality of cables, a block, and a locking unit. The housing has a groove and a slot, and the two end portions of each cable can only move within the groove and cannot exit the housing through the slot. When the locking unit is operated into an unlocked state, the block can be moved away from an opening in the housing, allowing each end portion to exit the housing through the opening.

10 Claims, 5 Drawing Sheets

LOCK FOR LOCKING MULTIPLE OBJECTS

FIELD OF INVENTION

The present invention relates to a cable lock, particularly a cable lock capable of locking multiple objects.

RELATED PRIOR ART

The basic structure of a traditional cable lock consists of a locking unit, a housing that contains the locking unit, and a cable connected to the housing. The locking unit includes a combination lock unit and/or a key lock unit. When the locking unit is operated into a locked state, one end of the cable is blocked by the locking unit and cannot be removed from the housing. However, when the locking unit is operated into an unlocked state, the locking unit releases the end of the cable, allowing it to be pulled out of the housing.

The housing of a traditional cable lock is typically equipped with only a single cable, which limits it to use this only cable to secure one object, such as a pair of zipper tabs on a suitcase, and unable to lock more objects. To address this issue, a cable lock capable of securing two objects has been developed. Unlike traditional cable locks, this type of cable lock is equipped with one cable on the upper side and another cable on the lower side of its housing.

SUMMARY OF THE INVENTION

The present invention provides a cable lock capable of locking multiple objects, comprises a housing, a plurality of cables, a block, and a locking unit. The housing has two walls positioned opposite to from each other and spaced apart, forming a groove and a slot between the two walls, and an opening formed in one of the walls. The groove and the slot are in communication with each other, and the slot is in communication with the outside. The width of the groove is greater than that of the slot. The opening is in communication with the groove. Each cable has two end portions, each end portion being located within the groove and capable of moving along the groove. Each end portion includes a neck section and a head section connected to the neck section, with the outer diameter of the neck section being smaller than the head section and smaller than the width of the slot. The outer diameter of the head section is smaller than the width of the groove, but greater than the width of the slot and smaller than the width of the opening. The block is disposed on the housing and positioned in a blocking position to block the opening. The block is further configured to be movable away from or returned to the blocking position. The locking unit is disposed on the housing and can be operated into a locked state and an unlocked state, wherein in the locked state, the locking unit prevents the block from being moved away from the blocking position, and in the unlocked state, the locking unit allows the block to be moved away from the blocking position.

In one embodiment, the slot of the present invention is located between the tops of the two walls.

In one embodiment, the locking unit of the present invention includes a key lock module, which comprises a movable member and a lock core. The movable member is positioned in a first position that prevents the block from moving in one direction, and can be moved from the first position to a second position that no longer prevents the block from moving in that direction. The lock core is connected to the movable member and can be rotated by a key. When the lock core is rotated from a locked position to an unlocked position, the movable member is driven by the lock core to move from the first position to the second position. When the lock core is rotated from the unlocked position back to the locked position, the movable member is driven by the lock core to move from the second position back to the first position.

In one embodiment, the movable member of the present invention has a long hole and an inclined surface, the block has a complementary inclined surface, and the lock core has an eccentric pin extending into the long hole. When the movable member is in the second position, the inclined surface of the movable member abuts against the complementary inclined surface of the block.

In one embodiment, the locking unit of the present invention further includes a combination lock module, which has a movable rod, with the movable member abutting a top portion of the movable rod. When the combination lock module is dialed to an incorrect code, the movable rod is prevented from moving. When the combination lock module is dialed to a correct code, the movable rod is allowed to move.

In one embodiment, the housing of the present invention has an embedded hole, and the locking unit includes a shell accommodating the key lock module and the combination lock module, the shell being embedded within the embedded hole of the housing.

In one embodiment, the two walls, the groove, and the slot of the present invention are all ring-shaped.

In one embodiment, the housing of the present invention includes a first ring-shaped portion and a second ring-shaped portion that can be merged together, with one wall formed on the outer periphery of the first ring-shaped portion and the other wall formed on the outer periphery of the second ring-shaped portion.

In one embodiment, the shell of the present invention includes a front disc-shaped portion and a rear disc-shaped portion capable of interlocking with each other, and after interlocking the front disc-shaped portion with the rear disc-shaped portion, the shell is clamped between the front disc-shaped portion and the rear disc-shaped portion.

DETAILED DESCRIPTION OF THE INVENTION

Figure 1:
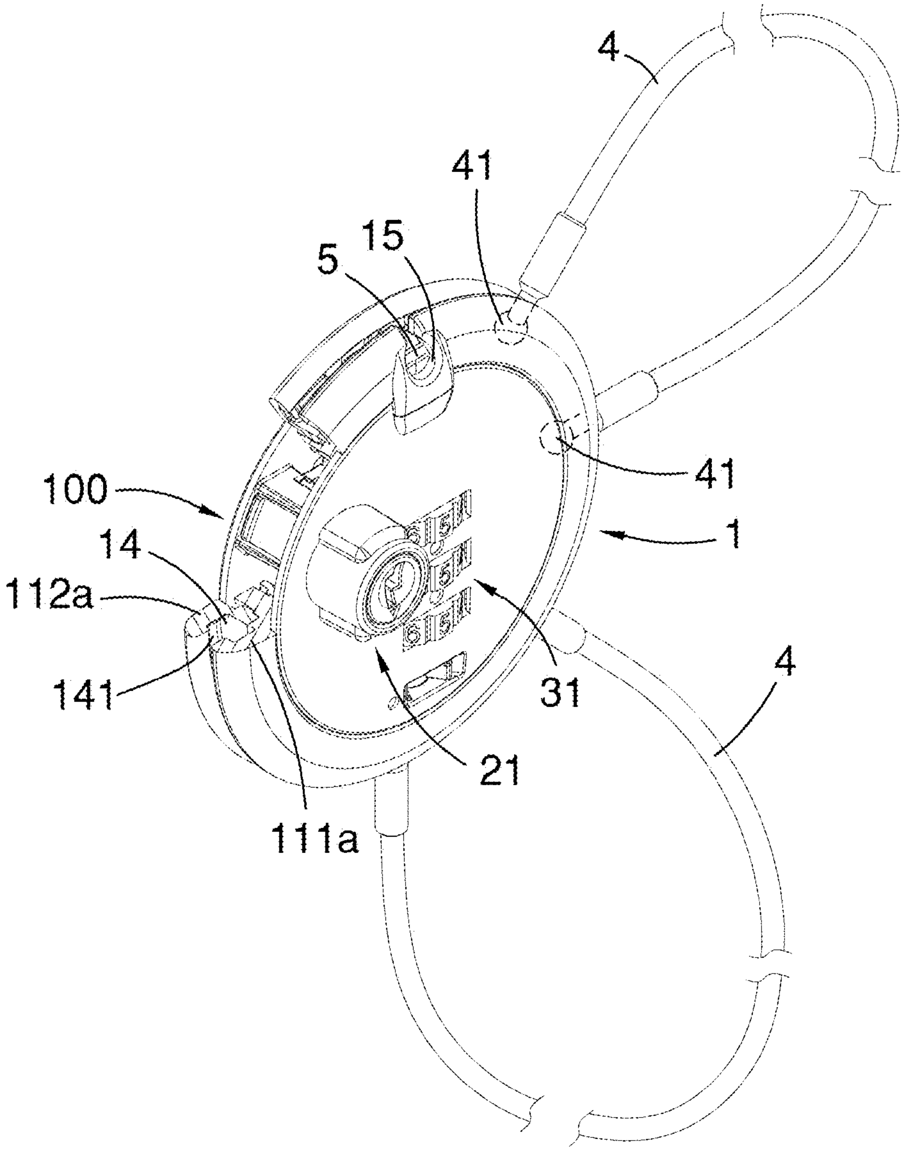
FIG. 1 shows a perspective view of one embodiment of the present invention.
Figure 2:
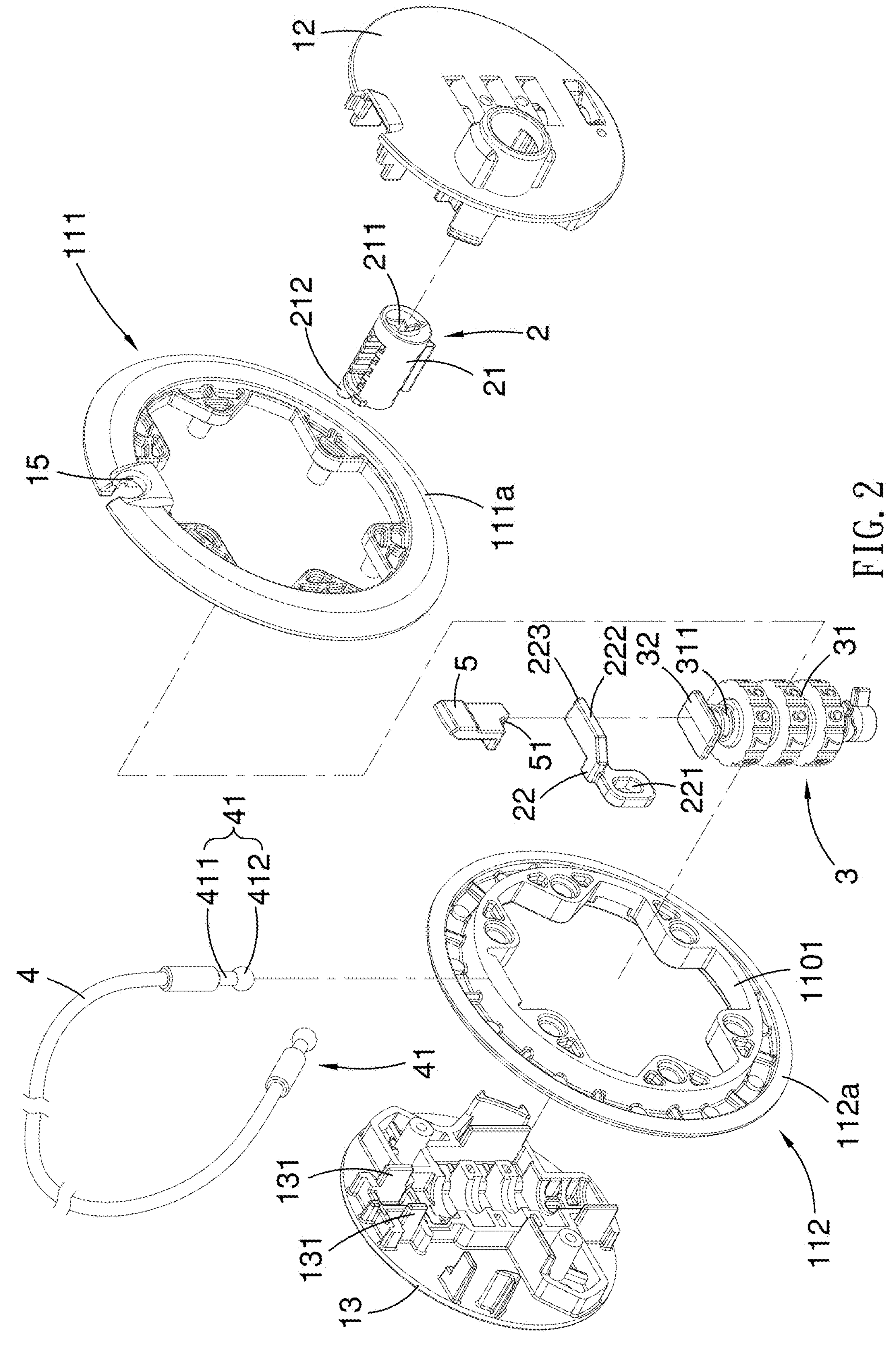
FIG. 2 shows an exploded perspective view of the embodiment of the present invention.

FIGS. 1 to 2 illustrate an embodiment of the cable lock capable of locking multiple objects according to the present invention. The cable lock includes a housing 1, a plurality of cables 4, a block 5, and a locking unit 100. The housing 1 has two walls 111*a* and 112*a* positioned opposite to each other and spaced apart, forming a groove 14 and a slot 141 between the two walls 111*a* and 112*a*, and an opening 15 formed in one of the walls 111*a*. The groove 14 and slot 141 are in communication with each other, and the slot 141 is in communication with the external environment. The groove 14 and slot 141 have the same length, and the width of the groove 14 is greater than the slot 141. Additionally, the height of the slot 141 is greater than the groove 14. In this embodiment, the slot 141 is located between the tops of the two walls 111*a* and 112*a*.

Each cable 4 has two end portions 41, with each end portion 41 located within the groove 14 and capable of moving along the length of the groove 14. As shown in FIG. 2, each end portion 41 includes a neck section 411 and a head section 412 connected to the neck section 411. The outer diameter of the neck section 411 is smaller than the width of the slot 141, allowing it to move along the length of the slot 141. The outer diameter of the head section 412 is smaller than the width of the groove 14, allowing it to move along the length of the groove 14. The outer diameter of the head section 412 is larger than the outer diameter of the neck section 411 and the width of the slot 141, but smaller than the width of the opening 15. Therefore, the head section 412 can only exit the groove 14 through the opening 15 and cannot exit through the slot 141.

In this embodiment, the housing 1 is ring-shaped, and the two walls 111*a* and 112*a* are also ring-shaped, resulting in the groove 14 and the slot 141 being ring-shaped as well. However, the aforementioned elements can also be in other shapes. The locking unit 100 includes a shell, which comprises a front disc-shaped portion 12 and a rear disc-shaped portion 13 capable interlocking with each other. After interlocking the front disc-shaped portion 12 with the rear disc-shaped portion 13, the shell 1 is clamped between the front disc-shaped portion 12 and the rear disc-shaped portion 13. The housing 1 includes a first ring-shaped portion 111 and a second ring-shaped portion 112 that can be merged together, with one wall 111*a* formed on the outer periphery of the first ring-shaped portion 111 and the other wall 112*a* formed on the outer periphery of the second ring-shaped portion 112. When the first ring-shaped portion 111 and the second ring-shaped portion 112 are merged to form the housing 1, the ring-shaped walls 111*a* and 112*a* are positioned opposite to each other, resulting in the formation of the ring-shaped groove 14 and the ring-shaped slot 141 between the two walls 111*a* and 112*a*.

Although either end portion 41 of each cable 4 can move along the groove 14, in actual use, each cable 4 is restrained by the object it passes through, so each cable 4 remains stationary. However, the housing 1 can be rotated relative to each cable 4, allowing a user to manually rotate the housing 1, thereby moving each end portion 41 within the groove 14. Through this operation, each end portion 41 has the opportunity to reach a preparation position aligned with the opening 15, but only one end portion 41 is allowed to stay at the preparation position at a time.

Figure 4:
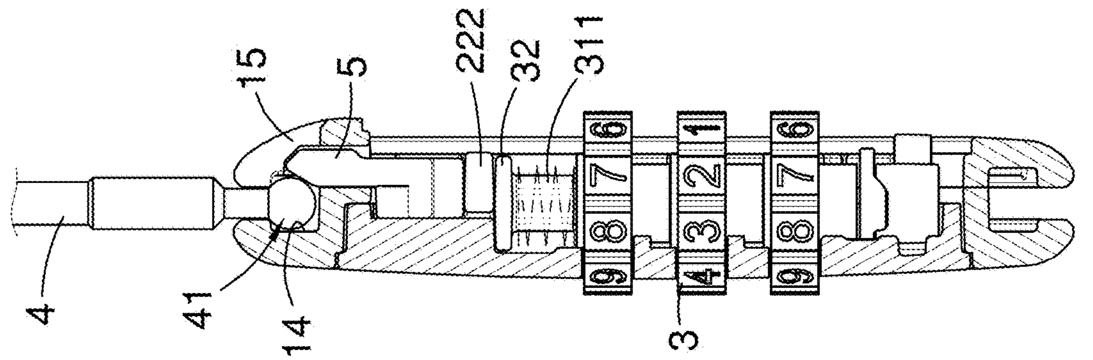
FIGS. 4 to 7 show action diagrams of the embodiment of the present invention.
Figure 3:
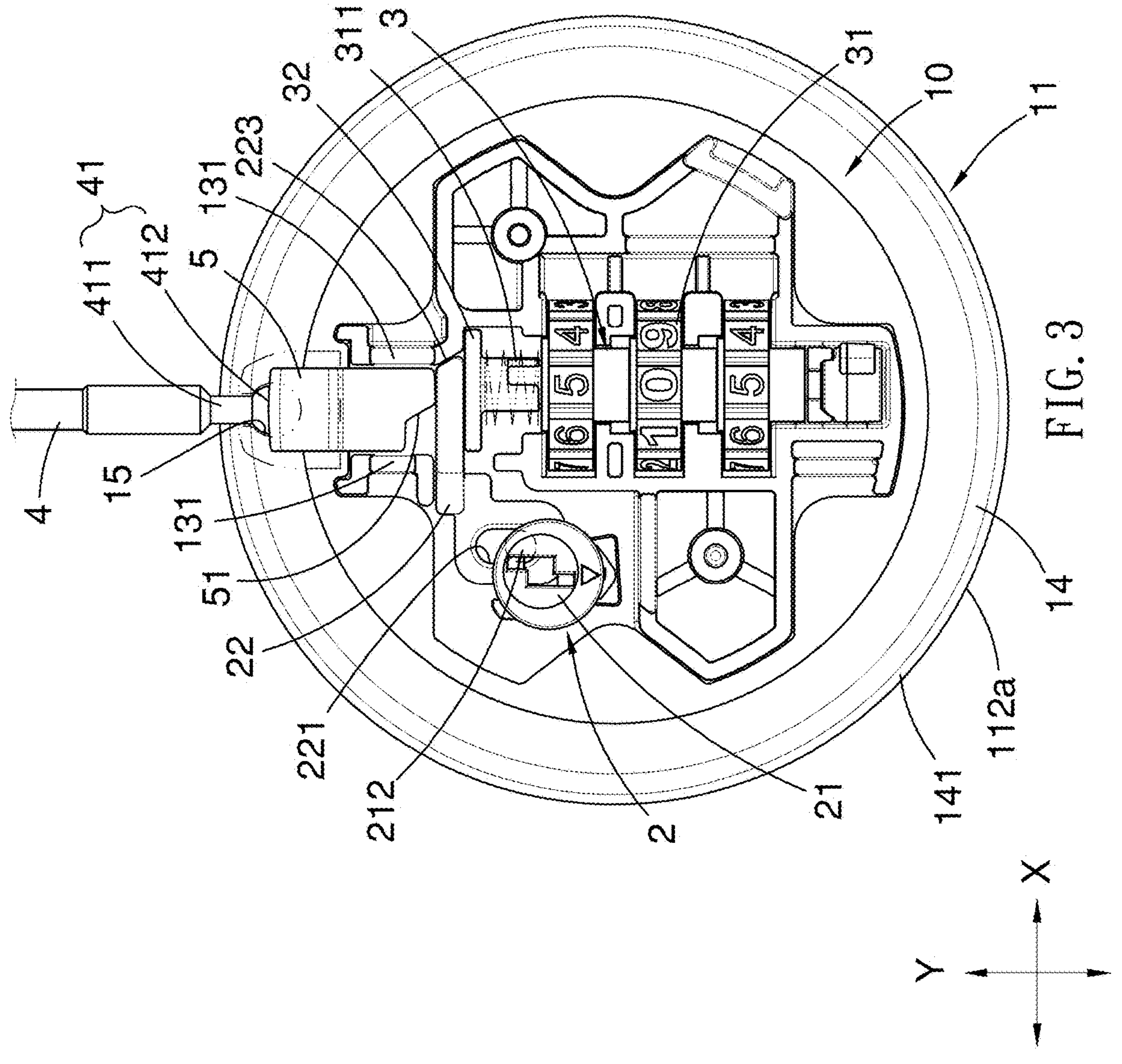
FIG. 3 shows a plan view of the embodiment of the present invention in a locked state.

The block 5 is disposed on the housing 1 and positioned in a blocking position to block the opening 15 (see FIGS. 1, 3, and 4). The block 5 is also configured to be movable away from or returned to the blocking position. The locking unit 100 is disposed on the housing 1 and can be operated into a locked state and an unlocked state, wherein in the locked state, the locking unit 100 prevents the block 5 from being moved away from the blocking position, and in the unlocked state, the locking unit 100 allows the block 5 to be moved away from the blocking position. In this embodiment, the block 5 is positioned between two restrictive blocks 131 of the rear disc-shaped portion 13 and can only move along a Y direction.

Preferably, the locking unit 100 includes a key lock module 2, which comprises a movable member 22 and a lock core 21. The movable member 22 is positioned in a first position that prevents the block 5 from moving in one direction and can be moved from the first position to a second position that no longer prevents the block 5 from moving in that direction. The lock core 21 is connected to the movable member 22 and can be rotated by a key (not shown in the figures). When the lock core 21 is rotated from a locked position (see FIG. 3) to an unlocked position (see FIG. 5), the movable member 22 is driven by the lock core 21 to move from the first position (see FIG. 3) to the second position (see FIG. 5). When the lock core 21 is rotated from the unlocked position back to the locked position, the movable member 22 is driven by the lock core 21 to move from the second position back to the first position.

One end of the lock core 21 has a keyhole 211 for inserting the key to control the rotation of the lock core 21. The other end of the lock core 21 has an eccentric pin 212, which is offset from the rotational center of the lock core 21. The movable member 22 includes a platform section 222 and a long hole 221 extending in the Y direction. The eccentric pin 212 extends into the long hole 221. One end of the platform section 222 of the movable member 22 has an inclined surface 223. When the lock core 21 is rotated, the eccentric pin 212 follows an arc-shaped movement trajectory, thereby pushing the movable member 22 to move in the X direction. When the movable member 22 is in the second position (see FIG. 5), the inclined surface 223 of the movable member 22 abuts against the complementary inclined surface 51 of the block 5.

The locking unit 100 also includes a combination lock module 3. The key lock module 2 switches between the locked state and the unlocked state by rotating the key, while the combination lock module 3 switches between the locked state and the unlocked state by dialing a code. As long as either the key lock module 2 or the combination lock module 3 is in the unlocked state, the block 5 can be pushed downward away from the blocking position, allowing each end portion 41 at the preparation position to pass through the opening 15 and exit the groove 14.

In this embodiment, as shown in FIGS. 2 and 3, the combination lock module 3 includes multiple dials 31 and a movable rod 32. The movable member 22 abuts the top portion of the movable rod 32 with its platform section 222. When the dials 31 are set to the correct code (see FIGS. 6 and 7), the movable rod 32 is allowed to move, putting the combination lock module 3 in the unlocked state. When the dials 31 are set to an incorrect code (see FIGS. 3, 4, and 5), the movable rod 32 is prevented from moving, putting the combination lock module 3 in the locked state.

As shown in FIGS. 3 and 4, since both the key lock module 2 and the combination lock module 3 are in the locked state, the block 5 is blocked by the movable member 22 and cannot move downward, and the movable rod 32 also cannot move. At this time, any end portion 41 of any cable 4 is blocked by the block 5 and cannot exit the groove 14 through the opening 15, which means that the cables 4 cannot be removed from the housing 1.

Figure 5:
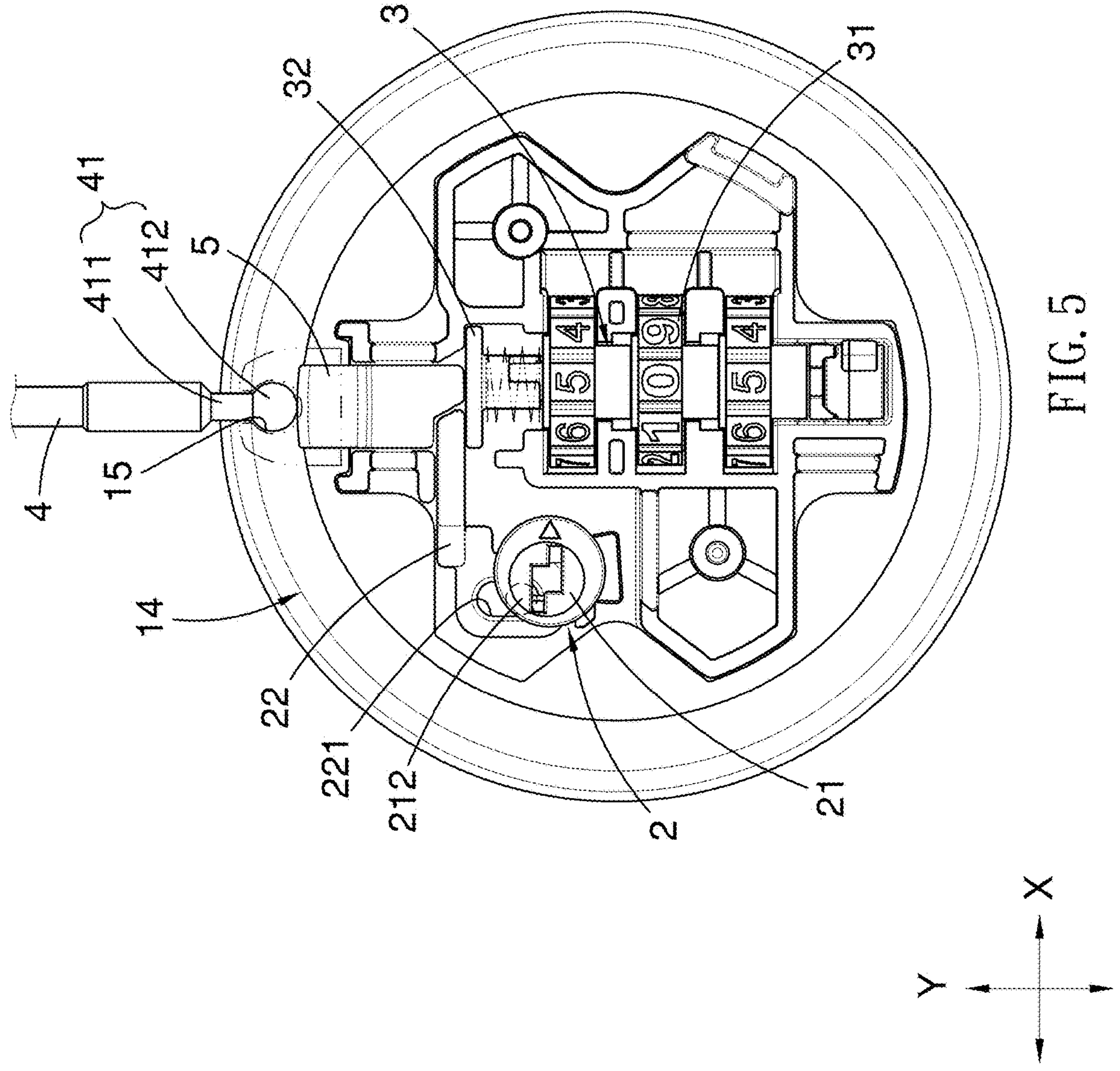
Figure 7:
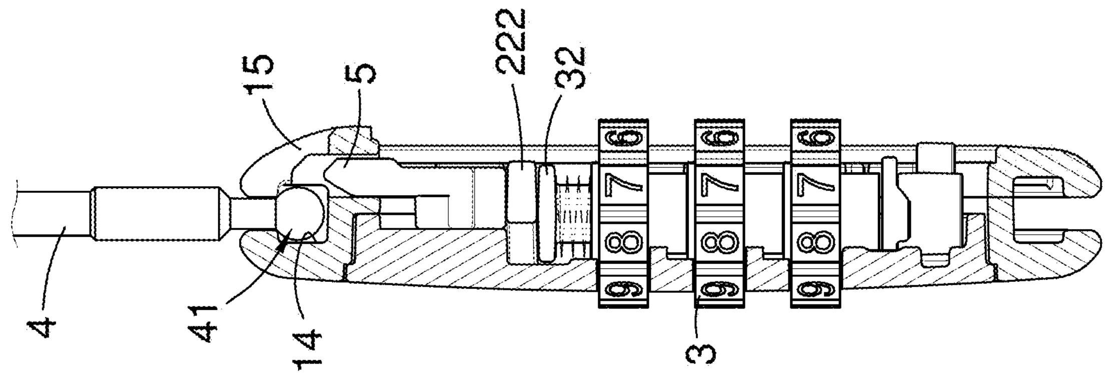

When a user turns the key counterclockwise to rotate the lock core 21 by ninety degrees, as shown in FIG. 5, the movable member 22 is pulled by the lock core 21 to the second position. At this point, a gap is created between the movable member 22 and the top portion 32 of the movable rod 32. Now, by sliding the end portion 41 located at the preparation position toward the opening 15, the block 5 can be pushed downward by a certain distance, thereby moving the block 5 away from the blocking position, as shown in FIGS. 5 and 7. Subsequently, the end portion 41 can be moved outside through the opening 15.

Conversely, when the lock core 21 in FIG. 5 is rotated 90 degrees clockwise back to the position shown in FIG. 3, the movable member 22 in FIG. 5 is pushed by the lock core 21 in the X direction. At this point, the block 5 will be pushed upward by the inclined surface 223 pressing against the complementary inclined surface 51, causing the block 5 to return to the blocking position shown in FIG. 3. At this time, the movable member 22 supports the block 5, and the block 5 is positioned between the opening 15 and the end portion 41 at the preparation position.

Figure 6:
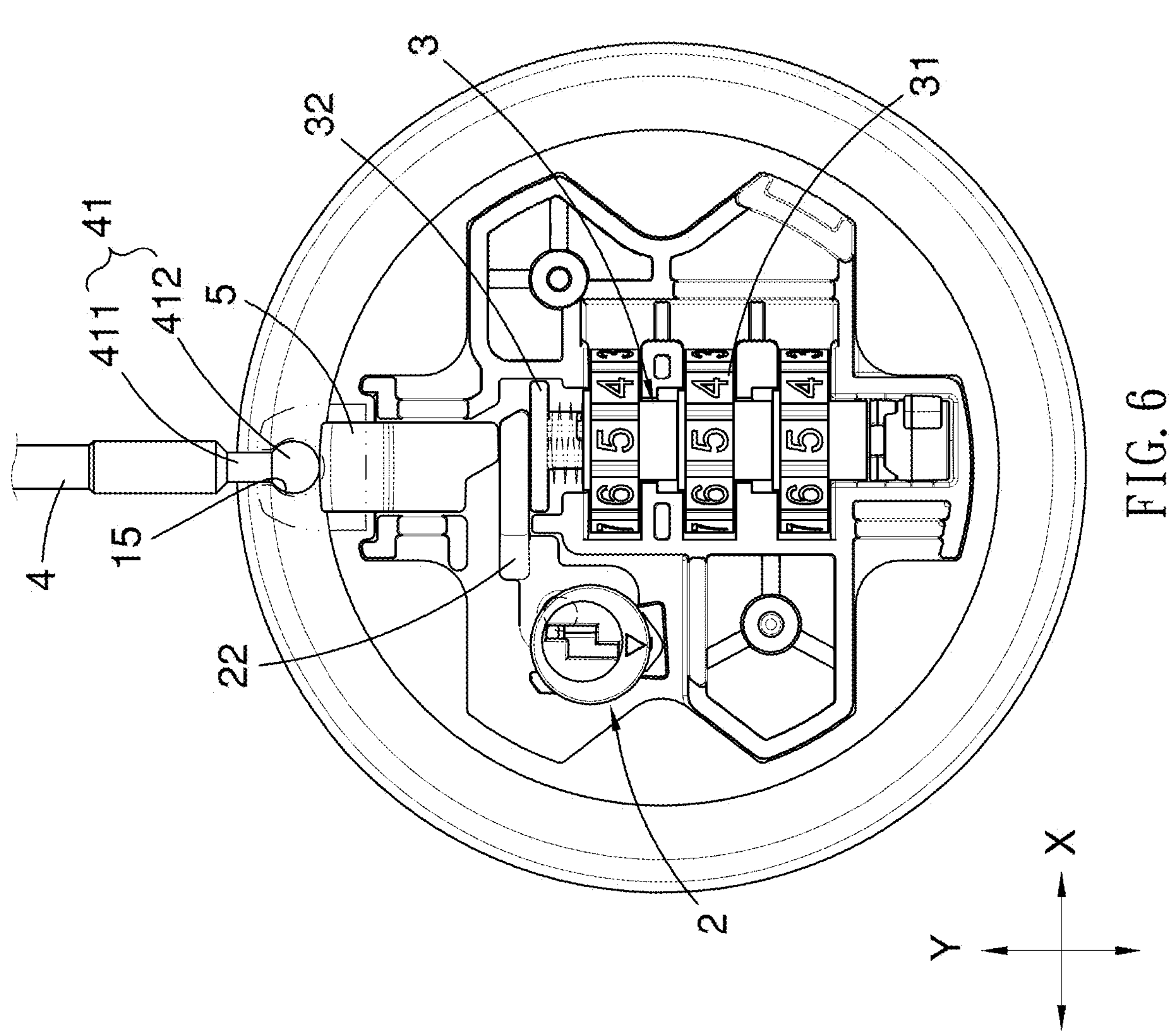

When the lock core 21 is in the locked state as shown in FIG. 3, and the dials 31 are set to the correct code, as shown in FIGS. 6 and 7, the movable rod 32 is allowed to move up and down. At this time, by sliding the end portion 41 located at the preparation position toward the opening 15, the block 5 can be pushed downward, pressing the movable member 22 and the movable rod 32 downward by a certain distance. Subsequently, the end portion 41 can move outside through the opening 15

What is claimed is:

1. A cable lock for locking multiple objects, comprising:

a housing, having two ring-shaped walls positioned opposite from each other and spaced apart, an inner portion enclosed by the two ring-shaped walls, a ring-shaped groove and a ring-shaped slot both formed between the two ring-shaped walls and both surrounding the inner portion, and an opening formed in one of the ring-shaped walls, wherein the ring-shaped groove and the ring-shaped slot communicate with each other, the ring-shaped slot surrounds the ring-shaped groove and communicates with the outside, the width of the ring-shaped groove is greater than the ring-shaped slot, both the ring-shaped slot and the opening communicates with the ring-shaped groove, and the opening communicates with the outside; and at least one cables, having two end portions, wherein each end portion includes a neck section and a head section connected to the neck section, the neck section is located within the ring-shaped slot and capable of moving along the ring-shaped slot, the head section is located within the ring-shaped groove and capable of moving along the ring-shaped groove, the outer diameter of the neck section is smaller than the head section and smaller than the width of the ring-shaped slot, the outer diameter of the head section is smaller than the width of the ring-shaped groove, and the outer diameter of the head section is greater than the width of the ring-shaped slot but smaller than the width of the opening;

a block, disposed on the housing and positioned to block the opening in a blocking position, wherein the block is further configured to be movable away from or returned to the blocking position; and a locking unit, disposed on the inner portion of the housing, capable of being operated into a locked state and an unlocked state, wherein in the locked state, the locking unit prevents the block from being moved away from the blocking position, and in the unlocked state, the locking unit allows the block to be moved away from the blocking position.

2. The cable lock for locking multiple objects as recited in claim 1, wherein the ring-shaped slot is located between the tops of the two ring-shaped walls.

3. The cable lock for locking multiple objects as recited in claim 1, wherein the locking unit includes a key lock module, the key lock module comprising:

a movable member, positioned in a first position that prevents the block from moving in one direction, and capable of being moved from the first position to a second position that no longer prevents the block from moving in the said direction;

a lock core, connected to the movable member and capable of being rotated by a key, wherein when the lock core is rotated from a locked position to an unlocked position, the movable member is driven by the lock core to move from the first position to the second position, and when the lock core is rotated from the unlocked position back to the locked position, the movable member is driven by the lock core to move from the second position back to the first position.

4. The cable lock for locking multiple objects as recited in claim 3, wherein the movable member has a long hole and an inclined surface, the block has a complementary inclined surface, and the lock core has an eccentric pin extending into the long hole, wherein when the movable member is in the second position, the inclined surface of the movable member abuts against the complementary inclined surface of the block.

5. The cable lock for locking multiple objects as recited in claim 3, wherein the locking unit further includes a combination lock module having a movable rod, the movable member abutting a top portion of the movable rod, wherein when the combination lock module is dialed to an incorrect code, the movable rod is prevented from moving, and when the combination lock module is dialed to a correct code, the movable rod is allowed to move.

6. The cable lock for locking multiple objects as recited in claim 5, wherein the inner portion of the housing has an embedded hole, and the locking unit includes a shell accommodating the key lock module and the combination lock module, the shell being embedded within the embedded hole of the inner portion of the housing.

7. The cable lock for locking multiple objects as recited in claim 6, wherein the shell comprises a front disc-shaped portion and a rear disc-shaped portion capable of interlocking with each other, and after interlocking the front disc-shaped portion with the rear disc-shaped portion, the housing is clamped between the front disc-shaped portion and the rear disc-shaped portion.

8. The cable lock for locking multiple objects as recited in claim 1, wherein the housing comprises a first ring-shaped portion and a second ring-shaped portion that can be merged together, wherein one ring-shaped wall is formed on the outer periphery of the first ring-shaped portion, and the other ring-shaped wall is formed on the outer periphery of the second ring-shaped portion.

9. The cable lock for locking multiple objects as recited in claim 1, wherein the housing comprises a first ring-shaped portion and a second ring-shaped portion that can be merged together, wherein one ring-shaped wall is formed on the outer periphery of the first ring-shaped portion, and the other ring-shaped wall is formed on the outer periphery of the second ring-shaped portion, wherein the inner portion of the housing has an embedded hole, and the locking unit includes a shell embedded within the embedded hole, a key lock module disposed on the shell, and a combination lock module disposed on the shell.

10. The cable lock for locking multiple objects as recited in claim 9, wherein the shell comprises a front disc-shaped portion and a rear disc-shaped portion capable of interlocking with each other, and after interlocking the front disc-shaped portion with the rear disc-shaped portion, the housing is clamped between the front disc-shaped portion and the rear disc-shaped portion.

* * * * *